United States Patent [19]

Nehen et al.

[11] 4,428,983

[45] Jan. 31, 1984

[54] PROCESS FOR THE PRODUCTION OF MICROCAPSULES

[75] Inventors: Ulrich Nehen, Leverkusen; Manfred Hajek, Cologne; Norbert Weimann; Manfred Dahm, both of Leverkusen, all of Fed. Rep. of Germany

[73] Assignee: Bayer Aktiengesellschaft, Leverkusen, Fed. Rep. of Germany

[21] Appl. No.: 310,923

[22] Filed: Oct. 13, 1981

[30] Foreign Application Priority Data

Oct. 16, 1980 [DE] Fed. Rep. of Germany ....... 3039117

[51] Int. Cl.³ .......................... B01J 13/02; B05D 7/00
[52] U.S. Cl. ............................ 427/213.34; 71/64.11; 71/DIG. 1; 252/350; 252/522 A; 252/610; 264/4.7; 428/402.21; 428/402.24; 523/176
[58] Field of Search ...................... 252/316; 264/4.7; 427/213.34

[56] References Cited

U.S. PATENT DOCUMENTS 3,577,515 5/1971 Vandegaer .................. 252/316 X
3,796,669 3/1974 Kiritani et al. ................. 252/316
3,981,821 9/1976 Kiritani et al. .................. 252/316
4,309,213 1/1982 Graber et al. ................ 252/316 X

*Primary Examiner*—Richard D. Lovering
*Attorney, Agent, or Firm*—Connolly and Hutz

[57] ABSTRACT

A process for encapsulating products in a polymer by interfacial polymerization, in which a stabilized dispersion of droplets of a first liquid which is to be encapsulated or a stabilized dispersion of solid particles which are to be encapsulated is formed in a continuous phase of a second liquid, and wherein one of the two capsule wall-forming reaction components is present in free form while the other of the two capsule wall-forming reaction components is present in reversibly blocked form, both reaction components are present in the first or second liquid without reacting with one another and the reaction component which is present in reversibly blocked form is deblocked by means of water present in the second or first liquid and then reacts with the reaction component present in free form to form a polymeric capsule wall, the droplets of the first liquid or the solid particles being encapsulated in small capsules consisting of polymeric material.

6 Claims, No Drawings

PROCESS FOR THE PRODUCTION OF MICROCAPSULES

This invention relates to a process for the production of microcapsules by interfacial polymerisation using compounds which form the walls of the capsules and of which one must be present in masked form.

There are several known processes for the production of microcapsules by interfacial polymerisation. In general, these known processes use a system consisting of at least two phases. The discontinuous phase (core material) contains in solution one of the two substances capable of wall formation which must be insoluble in the continuous phase. The continuous phase contains the other substance capable of wall formation which must be insoluble in the discontinuous phase. A polymerisation reaction between the two wall-forming substances takes place at the interface between the two phases, resulting in the formation of a shell surrounding the core material.

The shell or capsule wall must be insoluble in both phases. In these processes, one or the other phase may consist of an aqueous system. Processes of this type are described in U.S. Pat. Nos. 3,575,882; 3,577,515 and 3,429,827 and in German Auslegeschrift No. 1,519,925.

One disadvantage common to these known processes lies in the fact that, after the formation of a first, extremely thin capsule membrane, mutual contact between the wall-forming compounds may be made difficult or even impossible. The result of this is that both the core material and also the aqueous phase remain contaminated by unreacted material, thus making it more difficult to adjust the thickness of the capsule wall.

German Offenlegungsschrift No. 2,312,059 describes a process for forming the capsule wall by interfacial polymerisation in which an isocyanate monomer is hydrolysed to form the corresponding amine which in turn reacts with another isocyanate monomer to form the polyurea capsule. One of the disadvantages of this process is that hydrolysis of the monomeric isocyanate is accompanied by the release of carbon dioxide which may give rise to undesirable foaming and also to the build up of pressure when capsule slurries are stored in sealed containers. The elimination of these disadvantages requires a number of additional measures.

One of these measures is described, for example, in German Offenlegungsschrift No. 2,706,329, according to which the microcapsules are after-treated with ammonia or amines. Another disadvantage lies in the extremely limited possibility of varying the properties of the capsules through the chemical structure of the capsule wall consisting of polyurea.

U.S. Pat. No. 4,076,774 describes the production of double walled microcapsules in which the polyisocyanate contained in the core initially forms a polyurea shell partly in conjunction with a polyamine contained in the aqueous phase surrounding the core and then, in conjunction with a polyhydroxy compound also present in the core, builds up a polyurethane inner wall which is said to be connected through biuret groups to the polyurea shell initially formed at the phase interface.

This known process is attended by certain disadvantages which are apparent inter alia from the only example provided. While the outer shell is formed in a few minutes, a period of 7 hours is required for formation of the inner wall. The core-to-wall ratio amounts to at most 13:87 and is therefore extremely uneconomical. The choice of polyhydroxy compounds is limited to those which are insoluble in water and which do not contain primary hydroxyl groups. If primary hydroxyl groups were present, they would polymerise with the polyisocyanate at the actual mixing stage, and on dispersion in water, would impair a uniform capsule size distribution on account of the steadily increasing viscosity.

U.S. Pat. No. 3,796,669 describes the production of oil-containing microcapsules in which the capsule wall is formed from the interior of the capsule by dispersing in water a mixture of the oil to be encapsulated, a polyisocyanate and a wall-forming compound capable of reacting with the polyisocyanate, resulting in encapsulation of the oil.

This known process is attended by certain disadvantages. Since the wall-forming compound reacts with the polyisocyanate, polymerisation takes place at the actual mixing stage. This impairs encapsulation in general and makes it very difficult to obtain uniform capsule wall thicknesses and capsule size distributions.

It has now been found that these disadvantages may be obviated by encapsulating products by means of the process according to the present invention, the capsule wall being formed by an interfacial polymerisation process in which one of the two wall-forming reaction components is present in free form and the other in masked form. Both wall-forming reaction components are present together in one phase during production of the capsules and form a capsule wall at the interface with the other phase.

Accordingly, the present invention relates to a process for encapsulating products in a polymeric capsule wall by interfacial polymerisation, in which a stabilised dispersion of droplets of a first liquid which is to be encapsulated or a stabilised dispersion of solid particles which are to be encapsulated is formed in a continuous phase of a second liquid, and wherein one of the two capsule wall-forming reaction components is present in free form while the other of the two capsule wall-forming reaction components is present in reversibly blocked form, both reaction components are present in the first or second liquid without reacting with one another and the reaction component which is present in reversibly blocked form is deblocked by means of water contained in the second or first liquid and then reacts with the reaction component present in free form to form a polymeric capsule wall, the droplets of the first liquid or the solid particles being encapsulated in small capsules consisting of polymeric material.

In the process according to the present invention, the two wall-forming reaction components are present together either in the discontinuous phase or in the continuous phase without reacting with one another because one of the two reaction components is present in masked or blocked form. Through water present in the other phase which does not contain either of the two reaction components, the blocked reaction component is deblocked and is capable of reacting with the reaction component present in free form to form a capsule wall at the phase interface.

It is possible in this way to obtain capsule dispersions containing entirely satisfactory discrete capsules in which the microencapsulated products are surrounded by a polymer wall.

In one preferred embodiment of the present invention, a liquid mixture which consists of the solid or liquid products to be encapsulated, the two reaction components present in free or blocked form and, optionally, an auxiliary solvent and which is referred to as the organic phase is dispersed in a mixture of water, optionally protective colloids and optionally surfactants, which is termed the aqueous phase and which is substantially immiscible with the organic phase, for the purpose of producing small particles (droplets).

The water present in the continuous phase enables the two reaction components to react with one another to form polymeric capsule walls at the phase interface.

In another embodiment of the process according to the present invention, it is possible to encapsulate water or products present in aqueous solution or dispersion. In this case, a stabilised discontinuous aqueous phase containing the products to be encapsulated is prepared in a substantially water-immiscible continuous organic phase containing the two reaction components present in free form and in blocked form. Aqueous droplets are formed, at the interface of which the blocked reaction component is deblocked and reacts with the free reaction component to form polymeric capsule walls, the aqueous droplets being microencapsulated.

Reaction components present in free form and containing at least two isocyanate groups which are suitable for use in accordance with the present invention are aliphatic, cycloaliphatic, araliphatic, aromatic and heterocyclic polyisocyanates of the described, for example, by W. Siefken in Justus Liebigs Annalen der Chemie, 562, pages 75 to 136, for example those corresponding to the following general formula:

Q (NCO)$_n$ wherein n represents an integer of from 2 to 4, preferably 2; and

Q represents an aliphatic hydrocarbon radical containing from 2 to 18 carbon atoms, preferably from 6 to 10 carbon atoms, a cycloaliphatic hydrocarbon radical containing from 4 to 15 carbon atoms, preferably from 5 to 10 carbon atoms, an aromatic hydrocarbon radical containing from 6 to 15 carbon atoms, preferably from 6 to 13 carbon atoms, or an araliphatic hydrocarbon radical containing from 8 to 15 carbon atoms, preferably from 8 to 13 carbon atoms, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3 and 1,4-diisocyanate and mixtures of these isomers, 1-isocyanato-3,3,5-trimethyl-5-isocyanatomethyl cyclohexane (=isophorone diisocyanate; German Auslegeschrift No. 1,202,785, U.S. Pat. No. 3,401,190), xylylene-1,4- and 1,3-diisocyanate, 2,4- and 2,6-hexahydrotolylene diisocyanate and mixtures of these isomers, hexahydro-1,3- and/or 1,4-phenylene diisocyanate, perhydro-2,4′ and/or -4,4′-diphenyl methane diisocyanate, 1,3- and 1,4-phenylene diisocyanate, 2,4- and 2,6-tolylene diisocyanate and mixtures of these isomers, diphenyl methane 2,4′- and/or 4,4′-diisocyanate, naphthylene-1,5-diisocyanate.

According to the present invention, it is also possible for example, to use triphenyl methane 4,4′,4″-triisocyanate, polyphenyl polymethylene polyisocyanates of the type obtained by condensing aniline with formaldehyde, followed by phosgenation, and described, for example in British Pat. Nos. 874,430 and 848,671, m and p-isocyanatophenyl sulphonyl isocyanates according to U.S. Pat. No. 3,454,606, perchlorinated aryl polyisocyanates of the type described for example in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162) and in German Offenlegungsschrift Nos. 2,504,400; 2,537,685 and 2,552,350, norbonane diisocyanates according to U.S. Pat. No. 3,492,330, polyisocyanates containing allophanate groups of the type described, for example, in British Pat. No. 994,890, in Belgian Pat. No. 761,626 and in Published Dutch Pat. Application No. 7.102.524, polyisocyanates containing isocyanurate groups of the type described, for example, in U.S. Pat. No. 3,001,973; in German Pat. Nos. 1,022,789; 1,222,067 and 1,027,394 and in German Offenlegungsschrift Nos. 1,929,034 and 2,004,048, polyisocyanates containing urethane groups of the type described, for example, in Belgian Pat. No. 752,261 or in U.S. Pat. Nos. 3,394,164 and 3,644,457, polyisocyanates containing acylated urea groups according to German Pat. No. 1,230,778, polyisocyanates containing biuret groups of the type described, for example, in U.S. Pat. Nos. 3,124,605; 3,201,372 and 3,124,605 and in British Pat. No. 889,050, polyisocyanates produced by telomerisation reactions of the type described, for example, in U.S. Pat. No. 3,654,106, polyisocyanates containing ester groups of the type described, for example, in British Pat. Nos. 965,474 and 1,072,956, in U.S. Pat. No. 3,567,763 and in German Pat. No. 1,231,688, reaction products of the above-mentioned isocyanates with acetals according to German Pat. No. 1,072,385 and polyisocyanates containing polymeric fatty acid esters according to U.S. Pat. No. 3,455,883.

It is also possible to use the isocyanate group-containing distillation residues obtained in the commercial production of isocyanates, optionally in solution in one or more of the above-mentioned polyisocyanates.

In addition, it is also possible to use so-called "polyisocyanate prepolymers", for example the addition product of hexamethylene diisocyanate and hexane triol, the addition product of 2,4-tolylene diisocyanate with pyrocatechol, the addition product of tolylene diisocyanate with hexane triol, the addition product of tolylene diisocyanate with trimethylol propane, the addition product of xylylene diisocyanate with trimethylol propane or suitable polyisocyanates corresponding to the compounds mentioned above. Other suitable modified aliphatic isocyanates are those based on 1,6-hexamethylene diisocyanate, m-xylylene diisocyanate 4,4′-diisocyanato-dicyclohexyl methane and isophorone diisocyanate which contain at least two functional isocyanate groups per molecule.

Other suitable compounds are polyisocyanates based on derivatives of hexamethylene-1,6-diisocyanate having a biruet structure of which the production is described in German Auslegeschrift Nos. 1,101,394 and 1,543,178 and in German Offenlegungsschrift Nos. 1,568,017 and 1,931,055.

Before they are used for microencapsulation, the polyisocyanates may be additionally modified by reaction with difunctional and trifunctional chain-extending agents, for example water, with polyfunctional alcohols, such as ethane diol, glycerol or trimethylol propane, or with carboxylic acids, such as succinic acid, adipic acid, sebacic acid, in quantities of from 0.01 to 0.5 mole per isocyanate equivalent.

In addition to the isocyanate groups, carbodiimide, uretdione, uretone imine, uretidine dione diimine, 4-imino-oxazolidinone-(2)-β-alkylene propiolactone and cyclo-1,3-butane dione groups may also be present as reactive groups.

For example, it is possible to use polyisocyanatopolyuretone imines of the type obtained by subjecting hexamethylene-1,6-diisocyanate containing biuret groups to carbodiimide formation with organophosphorus catalysts, by further reaction of carbodiimide groups initially formed with isocyanate groups to form uretone imine groups. In addition, these isocyanates may be used in admixture with one another and with other aliphatic and aromatic isocyanates.

Depending on the reaction conditions, the resulting modified polyisocyanate may contain considerable proportions of oxadiazine trione, triisocyanurate or sym. triazine dione imine as structural elements. Such products are also suitable for use as shell-formers.

It is also possible to use diisocyanates corresponding to the following general formula:

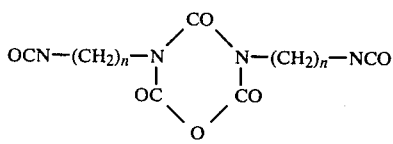

wherein n represents an integer of from 3 to 6.

In general, it is particularly preferred to use polyisocyanates which are easy to obtain on a commercial scale, for example 2,4- and 2,6-tolylene diisocyanate, also mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or from 2,6-tolylene diisocyanate or from 4,4'- and/or 2,4'-diphenyl methane diisocyanate or even from 1,6-hexamethylene diisocyanate and isophorone diisocyanate.

Reaction products of the above-mentioned polyisocyanates with compounds containing at least two isocyanate-reactive hydrogen atoms and generally having a molecular weight of from 400 to 10,000 may also be used as the reaction components present in free form.

Production of the reaction products which must contain at least two isocyanate groups and which are referred to hereinafter as "NCO-prepolymers" is known (cf R. Vieweg, A. Höchtlen, Kunststoff-Handbuch Vol. VII, Polyurethane, Carl-Hanser-Verlag, Munich, 1966, pages 84 to 85). The NCO prepolymers may be directly used in the form in which they accumulate during the production thereof for forming the capsules. The monomeric isocyanates still present in them may also be removed by a distillation-based treatment, for example by thin-layer evaporation.

In addition to compounds containing amino groups, thiol groups or carboxyl groups, compounds containing at least two isocyanate-reactive hydrogen atoms are preferably compounds containing hydroxyl groups, particularly compounds containing from 2 to 8 hydroxyl groups, above all those having molecular weights of from 400 to 10,000, preferably from 1000 to 10,000, for example polyesters, polyethers, polythioethers, polyacetals, polycarbonates and polyester amides containing at least 2, generally from 2 to 8, but preferably from 2 to 4 hydroxyl groups.

(a) The polyester containing hydroxyl groups suitable for use in accordance with the present invention are, for example, reaction products of polyhydric, preferably dihydric and, optionally trihydric, alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or may be unsaturated.

Examples of such carboxylic acids and derivatives thereof are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerised and trimerised unsaturated fatty acids, optionally in admixture with monomeric unsaturated fatty acids, such as oleic acid; terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylolethane, pentaerythritol, quinitol, mannitol, sorbitol, formitol, methyl glycoside, also diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones, for example ε-caprolactone, or of hydroxy carboxylic acids, for example ω-hydroxy caproic acid, may also be used.

(b) The polyethers containing at least 2, generally from 2 to 8, preferably 2 or 3, hydroxyl groups suitable for use in accordance with the present invention are also known and are obtained, for example, by polymerising epoxides, such as ethylene oxide, propylene oxide, butylene oxide, tetrahydrofuran, styrene oxide or epichlorhydrin, on their own, for example in the presence of Lewis catalysts, such as BF₃, or by the addition of these epoxides, preferably ethylene oxide and propylene oxide, optionally in admixture or successively, with starter components containing reactive hydrogen atoms, such as water, ammonia, alcohols, or amines, for example ethylene glycol, 1,3-propylene glycol or 1,2-propylene glycol, trimethylol propane, glycerol, sorbitol, 4,4'-dihydroxy diphenyl propane, aniline, ethanolamine or ethylene diamine. Sucrose polyethers of the type described for example, in German Auslegeschrift Nos. 1,176,358 and 1,064,938 and formitol- or formose-started polyethers (German Offenlegungsschrift Nos. 2,639,083 and 2,737,951) may also be used in accordance with the present invention. In many cases, it is preferred to use polyethers which predominantly contain primary OH-groups (up to 90%, by weight, based on all the OH-groups present in the polyether. Polybutadienes containing OH-groups are also suitable for use in accordance with the present invention.

(c) Among the polythioethers, particular reference is made to the condensation products of thiodiglycol on its own and/or with other glycols, dicarboxylic acids, formaldehyde, aminocarboxylic acids or amino alcohols. Depending on the co-components, the products in question are for example, polythio mixed ethers, polythioether esters or polythioether ester amides.

(d) Suitable polyacetals are, for example, the compounds obtainable from the reaction of glycols, such as diethylene glycol, triethylene glycol, 4,4'-dioxethoxy diphenyl dimethyl methane and hexane diol, with formaldehyde. Polyacetals suitable for use in accordance with the present invention may also be obtained by polymerising cyclic acetals, such as trioxane (German Offenlegungsschrift No. 1,694,128).

(e) Suitable polycarbonates containing hydroxyl groups are known and may be obtained, for example, by reacting diols, such as 1,3-propane diol, 1,4-butane diol and/or 1,6-hexane diol, diethylene glycol, triethylene glycol, tetraethylene glycol or thiodiglycol, with diaryl carbonates, for example, diphenyl carbonate, or with phosgene (German Auslegeschrift Nos. 1,694,080; 1,915,908; and 2,221,751; German Offenlegungsschrift No. 2,605,024).

(f) The polyester amides and polyamides include, for example, the predominantly linear condensates obtained, for example, from polybasic saturated or unsaturated carboxylic acids or anhydrides thereof and polyfunctional saturated or unsaturated amino alcohols, diamines, higher polyamines and mixtures thereof.

(g) Polyhydroxyl compounds already containing urethane or urea groups and optionally modified natural polyols, such as castor oil or carbohydrates, for example starch, may also be used. Addition products of alkylene oxides with phenol/formaldehyde resins or even with urea/formaldehyde resins may also be used in accordance with the present invention.

(h) Before they are used in the polyisocyanate-polyaddition process, the above-mentioned polyhydroxyl compounds may be modified in various ways: thus, according to German Offenlegungsschrift Nos. 2,210,839 (U.S. Pat. No. 3,849,515) and 2,544,195, a mixture of different polyhydroxyl compounds (for example a polyether polyol and a polyester polyol) may be condensed by etherification in the presence of a strong acid to form a relatively high molecular weight polyol which is made up of different segments attached through ether bridges. It is also possible, for example in accordance with German Offenlegungsschrift No. 2,559,372, to introduce amide groups into the polyhydroxyl compounds or, in accordance with German Offenlegungsschrift No. 2,620,487, to introduce triazine groups by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (German Offenlegungsschrift Nos. 2,714,289; 2,714,292 and 2,714,293). In some cases, it is of particular advantage completely or partly to convert the relatively high molecular weight polyhydroxyl compounds into the corresponding anthranilic acid esters by reaction with isatoic acid anhydride, as described in German Offenlegungsschrift Nos. 2,019,432 and 2,619,840 and in U.S. Pat. Nos. 3,808,250; 3,975,428 and 4,016,143. Relatively high molecular weight compounds containing terminal aromatic amino groups are obtained in this way.

According to German Offenlegunsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazide groups are described in German Offenlegungsschrift No. 1,694,152 (U.S. Pat. No. 3,625,871).

(i) According to the present invention, it is also possible to use polyhydroxyl compounds containing high molecular weight polyadducts and polycondensates or polymers in finely disperse or dissolved form. Such polyhydroxyl compounds are obtained, for example, by carrying out polyaddition reactions (for example reactions between polyisocycanates and aminofunctional compounds) and polycondensation reactions (for example between formaldehyde and phenols and/or amines) in situ in the above mentioned compounds containing hydroxyl groups. Such processes are described for example, in German Auslegeschrift Nos. 1,168,075 and 1,260,142 and in German Offenlegungsschrift Nos. 2,324,134; 2,423,984; 2,512,385; 2,513,815; 2,550,796; 2,550,797; 2,550,833; 2,550,862; 2,633,293 and 2,639,254. However, it is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers of the type obtained, for example, by polymerising styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Patent No. 1,769,795; U.S. Pat. No. 3,637,909) are also suitable for use in the process according to the present invention.

Representatives of the above-mentioned compounds used in accordance with the present invention are described for example, in High Polymers, Vol. XVI, "Polyurethanes, Chemistry and Technology", by Saunders-Frisch, Interscience Publishers, New York/London, Vol I, 1962, pages 32 to 42 and pages 44 to 54 and Vol II, 1964, pages 5–6and 198–199 and in Kunststoff-Handbuch, Vol. VII, Vieweg-Höchtlen, Carl-Hanser-Verlag, Munich, 1966, for example on pages 45 to 71. It is, of course, possible to use mixtures of the above-mentioned compounds containing at least two isocyanate-reactive hydrogen atoms and having a molecular weight of from 400 to 10,000, for example mixtures of polyethers and polyesters.

Suitable reversibly blocked reactants for the polyisocyanates used in the process according to the present invention are, in principle, any compounds which may be converted by water into a reactive form in order thereafter to react further rapidly with NCO-groups. Accordingly, suitable reversibly block reactants are substances which do not contain NCO-reactive hydrogen atoms, but which may be converted by hydrolysis into polyamines or hydroxy amines. Substances which meet this requirement may be readily obtained, for example, by the condensation, with elimination of water, of suitable carbonyl compounds with polyamines or hydroxy amines using methods known from the literature.

Suitable blocked polyamines contain one or more of the following structural elements:

(1.) 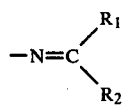 I (2.) 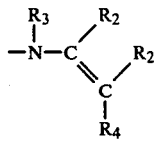 II (3.) 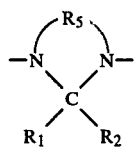 III (4.) 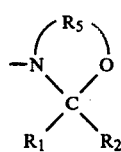 IV wherein $R_1$ to $R_4$ which may be the same or different represent H, an alkyl radical, preferably a $C_1$–$C_4$ alkyl radical, a cycloalkyl radical, preferably a $C_4$–$C_8$ cycloalkyl radical, or an aryl radical, preferably a $C_6$–$C_8$ aryl radical; and $R_5$ represents an alkylene radical, preferably a $C_2$–$C_4$ alkylene radical.

The first group includes aldazines, ketazines, aldimines and ketimines which are derived from hydrazine or from compounds containing $NH_2$-groups. The reaction of NH-groups with carbonyl compounds leads to enamine groups (II).

The cyclic aminals (III) are described in European Pat. No. 0 001 005. The N, O-acetals (IV) are produced, for example, in accordance with U.S. Pat. Nos. 4,002,601; 3,743,626; 3,661,923 and 3,864,335.

The following aldehydes, for example, are suitable blocking agents for the polyamines: aliphatic aldehydes, such as formaldehyde, acetaldehyde, propionaldehyde, butyraldehyde, isobutyraldehyde, trimethyl acetaldehyde, heptyl aldehyde, 3-formyl heptane, hexahydrobenzaldehyde, or aromatic aldehydes, such as 1,2,5,6-tetrahydrobenzaldehyde, benzaldehyde.

Examples of suitable ketones are acetone, methyl ethyl ketone, methyl propyl ketone, diethyl ketone, methyl isopropyl ketone, methyl isobutyl ketone, t-butyl methyl ketone, diisobutyl ketone, cyclopentanone, cyclohexanone.

Suitable polyamines and hydroxyamines are any of a number of compounds which contain at least two NH-functions or one NH-function and one OH-function, preferably low molecular weight aliphatic compounds, preferably containing from 2 to 10 carbon atoms, aliphatic-aromatic compounds preferably containing from 7 to 9 carbon atoms, aromatic compounds preferably containing from 6 to 10 carbon atoms, cycloaliphatic compounds preferably containing from 5 to 10 carbon atoms or heterocyclic compounds preferably containing from 4 to 6 carbon atoms and heteroatoms, such as N, O or S in the ring. Examples of such compounds are hydrazine, ethylene diamine, 1,3-diaminopropane, N,N'-dimethyl ethylene diamine, diethylene triamine, bis-(2-methylaminoethyl)-amine, methyl-bis-(2-methylaminoethyl)-amine, triethylene tetramine, tetraethylene pentamine, pentaethylene hexamine, propylene diamine, dipropylene triamine, tripropylene tetramine, 1-amino-3-methylaminopropane, bis-(3-aminopropyl)-amine, bis-(3-aminopropyl)methylamine, 1,4-diaminobutane, 1,6-diaminohexane, 2,5-trimethylhexane diamine, 2,2,4- and 2,4,4-trimethyl hexamethylene diamine, 1,4-butane diol bis-(3-aminopropyl ether), 1,3- and 1,4-diaminocyclohexane, 4,4'-diaminodicyclohexyl methane, 1,3- and 1,4-xylylene diamine, isophorone diamine, 1,3- and 1,4-diaminobenzene, diethanolamine and bis-(2-hydroxypropyl)-amine.

In addition, it is possible to use polyamines of relatively high molecular weight, preferably having molecular weights of from 1000 to 6000, of the type obtained, for example, by reacting polyether polyols, preferably having molecular weights of from 500 to 6000, with ammonia and hydrogen under pressure in the presence of suitable catalysts or by reacting organic isocyanates containing nitro groups, preferably p-nitrophenyl isocyanate, with polyether polyols, followed by reduction.

In another embodiment, prepolymers containing terminal isocyanate groups are reacted with already blocked amines still containing an isocyanate-reactive group, for example OH or NH.

Sterically hindered polyamines and/or sterically hindered carbonyl compounds are particularly suitable. Polyaldimines or polyketimines modified by Michael's addition may also be used.

In the practical application of the process according to the present invention for the production of microcapsules, the mixtures of substances serving as the discontinuous phase are first separately prepared and converted with one another into a finely divided suspension by means of dispersion units generating a shear gradient. Once the required particle size has been reached, the dispersion is either gently stirred or left standing until formation of the capsule wall is complete. Depending on the purpose for which it is intended, the thus-produced capsule dispersion may be used either in this form or after the addition of stabilising auxiliaries. It is also possible to separate the capsules from the continuous phase by known methods, for example by filtration, centrifuging or spray drying, in order in this way to obtain a free flowing capsule powder.

In cases where the continuous phase is aqueous it may be advantageous additionally to use auxiliary solvents in the production of the substance mixture serving as the discontinuous organic phase, particularly when mixing of the liquid or solid products to be encapsulated with the wall-formers is generally complicated or when the mixture becomes too viscous either because solid particles are encapsulated or because solid or highly viscous wall-formers are used. Accordingly, the function of the auxiliary solvents additionally used is to reduce the viscosity of the discontinuous phase, to dissolve insoluble consitituents which may be present and/or to facilitate dispersion to the required particle size.

Suitable solvents are solvents which are incapable of reacting with isocyanates and which may optionally be removed after dispersion or at some later stage without damaging the capsules.

It is preferred to use low-boiling solvents which may readily be removed by evaporation, for example n-pentane, methylene chloride, chloroform, ethyl acetate, methyl ethyl ketone and carbon tetrachloride.

It is also possible to use water-dilutable solvents which are incapable of reacting with isocyanates and which may optionally be removed after dispersion or at some later stage without damaging the capsules. Examples of such solvents are acetone, tetrahydrofuran, dioxane, and dimethyl formamide.

In the encapsulation of solid particles by known interfacial polymerisation processes, the capsule wall is generally not sufficiently impermeable if, after formation of a first thin membrane, the further access of wall-forming reactants is retarded or prevented.

If the wall-former present in the core material contains isocyanate groups, these isocyanate groups may give off $CO_2$ with water, which is able to diffuse through the very thin capsule membranes, to form polyurea. In many cases, this gives rise to foam-like and therefore permeable structure of the capsule wall so that water-soluble solids may only be encapsulated very uneconomically if at all.

It must therefore be regarded as surprising that a capsule wall should surround solids in watertight manner when water is required for its formation, as is the case according to the present invention.

The dispersion of the discontinuous phase in the continuous phase in accordance with the present invention may be made easier by using auxiliaries in the form of protective colloids and/or surfactants. The addition may be made both through the organic phase and also through the aqueous phase, the auxiliaries being distributed between the phases, according to the relative solubilities, after they have been mixed.

Suitable surfactants are anionic, cationic and nonionic emulsifiers. Examples of such emulsifiers are alkyl sulphonates, alkyl benzene sulphonates, polyoxy ethylene sulphonate, ethoxylated 3-benzyl hydroxybiphenyl, sorbitan fatty acid esters, polyoxyethylene alkyl ethers, and ethoxylated nonyl phenols.

It is also possible to use mixtures of at least two emulsifiers. They are added in quantities of from 0.01 to 5%, by weight, based on the particular phase.

Examples of protective colloids are polyvinyl alcohols, polyacrylates, polyacrylamide, gelatin, gum arabic, starch, casein, carboxy methyl cellulose, hydroxy ethyl cellulose, methyl cellulose, ethyl cellulose, cellulose acetobutyrate, polyvinyl pyrrolidone, hydroxy methyl cellulose, and montmorillonites.

It is also possible to use mixtures of at least two protective colloids. They are added in quantities of from 0.01 to 10%, by weight, preferably from 0.1 to 5%, by weight.

The quantity in which the above-mentioned dispersion aids are added depends, for example, upon the properties of all the substances involved in encapsulation, upon the reaction conditions, upon the required capsule diameter, upon the stirring time and speed and may readily be determined by corresponding tests.

The mixture serving as the discontinuous organic phase contains up to 97%, by weight, preferably from 50 to 95%, by weight, of product to be encapsulated and at least 3%, by weight, preferably from 5 to 50%, by weight, of a mixture of isocyanate-containing and blocked wall-former. The mixture of isocyanate-containing and blocked wall-former has such a quantitative composition that, after deblocking by the water in the continuous phase, a molar ratio between the respective functional groups of from 1:0.1 to 1:100, preferably from 1:0.1 to 1:10, more preferably of the order of 1:1, i.e. stoichiometric, is obtained. Stoichiometric procedure ensures above all that all the isocyanate groups react to form a chemically homogeneous polymeric capsule wall and that no carbon dioxide is given off.

The mixture prepared as the organic phase is stable in storage in the absence of moisture and is dispersed as required in a continuous aqueous phase, to which dispersion aids may be added as mentioned above, in such a quantity that the concentration of the organic phase in the dispersion amounts to from 1 to 50%, by weight, preferably from 20 to 40%, by weight.

It must be regarded as surprising that, in spite of the large excess of water in the aqueous phase, based on the amount of water actually required for freeing (de-blocking) the blocked wall-former present in the organic phase, the adjustment of the particle size by intensive mixing of the two phases may be conveniently achieved and that formation of the capsule walls only begins and ends thereafter with the dispersion being gently stirred or left standing. Formation of the polymeric capsule walls may be accelerated by additionally heating the dispersion to from 20° to 95° C., preferably from 40° to 70° C.

Depending on the purpose for which the microcapsules are to be used, it may be desirable to modify the structure of the capsule walls, for example in regard to the mechanical stability, the impermeability, the permeability or the temperature stability thereof. This may be done, on the one hand, through the large number of isocyanates which may be used and, on the other hand, through a large number of blocked wall-formers. In addition, it is possible to use mixtures of the isocyanates and of the blocked wall-formers.

In another embodiment of the process according to the present invention, modification of the capsule wall is obtained by using the blocked reaction component in such quantities, based on the isocyanate, that part of the isocyanate is available for reaction with other reactants. For example, the isocyanate may be hydrolysed to form an amine which in turn reacts with more isocyanate to form a polyurea. Microcapsules produced in this way have a chemically mixed polymeric structure.

In another preferred embodiment, that part of the isocyanate which is available for reactions with other reactants contributes towards formation of the capsule wall in that, after adjustment of the particle size, capsule wall-forming reaction components containing at least two NH-groups or one NH-group and one OH-group are additionally introduced into the continuous aqueous phase. To this end, it is possible to use both reaction components of the type which are identical with the deblocked form of the reaction components present in blocked form in the discontinuous phase and also reaction components which are different from those reaction components. It is also possible to introduce mixtures of at least two reactants into the aqueous phase. The quantities of the blocked reaction component present in the continuous phase and of the reactants present in the aqueous phase are adapted to one another in such a way that the sum of the functional groups thereof bears a molar ratio to the isocyanates of from 1:0.01 to 1:100, preferably from 1:0.1 to 1:10, more preferably of the order of 1:1.

So far as the mole percentages are concerned, from 1 to 99% of the functional groups are in the discontinuous phase, and accordingly, from 99 to 1% in the continuous phase, the preferred distributions being from 25 to 75% and from 75 to 25%, respectively. Suitable reactants are hydroxy amines, aliphatic, cycloaliphatic or aromatic polyamines. Examples of such compounds are ethanolamine, diethanolamine, triethanolamine, diisopropanolamine, 2-hydrazinoethanol, hydrazine, 1,2-ethylene diamine, 1,2-propylene diamine, 1,3-propylene diamine, bis-(3-aminopropyl)-amine, bis-(2-methylaminoethyl)-methylamine, 1,4-diaminocyclohexane, 3-amino-1-methylaminopropane, N-hydroxy ethyl ethylene diamine, N-methyl-bis-(3-aminopropyl)-amine, 1,4-diamino-n-butane, 1,6-diamino-n-hexane, 1,2-ethylene diamine-N-ethyl sulphonic acid (in the form of an alkali metal salt), N-aminoethyl-1,2-ethylene diamine, bis-(N,N'-aminoethyl)-1,2-ethylene diamine, tetraethylene pentamine, pentaethylene hexamine, 1,4-diaminobenzene, 4,4-diaminodiphenyl methane, 1,4-diaminocyclohexane, 1-amino-3,3,5-trimethyl-5-aminomethyl cyclohexane.

Hydrazine and its derivatives are also regarded as diamines in the present context.

In cases where water, aqueous solutions or dispersions are encapsulated, the continuous phase consists of a solvent or of a mixture of at least two solvents, the isocyanate-containing wall-former, the wall-former present in blocked form and, optionally, dispersion aids in the form of surfactants and/or protective colloids. The quantities in which the isocyanate-containing and blocked wall-former is used are selected in such a way that, after deblocking by the water in the continuous phase, a molar ratio between the respective functional groups of from 1:0.05 to 1:20, preferably of the order of 1:1, i.e. a stoichiometric molar ratio, is obtained.

Stoichiometric procedure ensures above all that all the isocyanate groups react fully to form a chemically homogeneous polymeric capsule wall and that no carbon dioxide is given off. Mixtures of the isocyanates and of the blocked wall-formers may be used for modifying the microcapsules produced in accordance with the present invention.

The quantity of the aqueous phase to be encapsulated is selected in such a way that its concentration in the dispersion amounts to from 1 to 50%, by weight preferably, from 10 to 30%, by weight. Formation of the capsule walls after dispersion may be accelerated by heating to from 20° to 95° C., preferably from 40° to 70° C. The thus-obtained capsules have a core-to-wall ratio of from 95:5 to 10:90, preferably from 90:10 to 60:40.

Depending on the particular application envisaged, the capsules are used in the form of a capsule suspension, optionally after exchange of the continuous phase, or are dried after separation from the organic phase and are used in the form of a capsule powder.

The solvents used which form the continuous phase are distinguished on the one hand, by the extremely low water uptake thereof, and on the other hand, by adequate solubility for the blocked and the isocyanate-containing wall-former. In addition, they are required to be inert to isocyanates. It is also possible to use mixtures of at least two different solvents.

Examples of suitable solvents are kerosene, n-paraffins, isoparaffins, cyclohexane, methyl cyclohexane, chlorinated diphenyl, silicone oil, monochlorobenzene, 1,1,2-trichloro-1,2,2-trifluoroethane, partially hydrogenated terphenyls, alkylated diphenyls, alkylated naphthalenes, aryl ethers, aryl alkyl ethers, and higher-alkylated benzene.

In another embodiment of the process according to the present invention, the aqueous phase whicn is to be encapsulated may contain (any) quantities of capsule wall-forming reaction components which contain at least two NH-groups or one NH-group and one OH-group. They may contribute towards formation of the capsule wall. Suitable compounds are hydroxyamines, aliphatic, cycloaliphatic and aromatic polyamines, for example ethanolamine, diethanolamine, triethanolamine, diisopropanolamine, 2-hydrazinoethanol, hydrazine, 1,2-ethylene diamine, 1,2-propylene diamine, 1,3-propylene diamine, bis-(3-aminopropyl)-amine, bis(2-methylaminoethyl)-methylamine, 1,4-diaminocyclohexane, 3-amino-1-methyl-methylaminopropane, N-hydroxyethyl ethylene diamine, N-methyl-bis-(3-aminopropyl)-amine, 1,4-diamino-n-butane, 1,6-diamino-n-hexane, ethylene-(1,2)-diamine-N-ethyl sulphonic acid (in the form of an alkali metal salt), N-aminoethyl-1,2-ethylene diamine, bis-(N,N'-aminoethyl)-1,2-ethylene diamine, tetraethylene pentamine, pentaethylene hexamine, 1,4-diaminobenzene, 4,4-diaminodiphenyl methane, 1,4-diaminocyclohexane, 1-amino-3,3,5-triethyl-5-aminoethyl cyclohexane.

Hydrazine and its derivatives are also regarded as diamines in the present context.

De-blocking of the blocked wall-former may be optimised by the addition of inorganic or organic acids or salts. They may be added to the aqueous or organic phase before, during or after production of the dispersion.

The reaction velocity of the wall-forming reactants may also be influenced by catalysts of the type commonly used for polyurea- and polyurethane-forming reactions. The following are examples of suitable catalysts:

1. Tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethylaminoethyl)adipate, N,N-diethyl benzylamine, pentamethyl diethylene triamine, N,N-dimethyl cyclohexylamine, N,N,N',N'-tetramethyl-1,3-butane diamine, N,N-dimethyl-$\beta$-phenyl ethylamine, 1,2-dimethyl imidazole, 2-methyl imidazole.

2. Tertiary amines containing isocyanate-reactive hydrogen atoms, for example triethanolamine, triisopropanolamine, N-methyl diethanolamine, N-ethyl diethanolamine, N,N-dimethyl ethanolamine and reaction products thereof with alkylene oxides, such as propylene oxide and/or ethylene oxide.

3. Silaamines containing carbon-silicon bonds of the type described, for example, in German Pat. No. 1,229,290, for example 2,2,4-trimethyl-2-silamorpholine, 1,3-diethylaminomethyl tetramethyl disiloxane.

4. Nitrogen-containing bases, such as tetra-alkyl ammonium hydroxides, alkali metal hydroxides, such as sodium hydroxide, alkali metal phenolates, such as sodium phenolate, or alkali metal alcoholates, such as sodium methylate, and hexahydrotriazines.

5. Organometallic compounds, particularly organotin compounds, preferably tin(II)salts of carboxylic acids, such as tin(II)acetate, tin(II)octoate, tin(II)ethyl hexoate and tin(II)laurate, and the dialkyl tin salts of carboxylic acids, such as dibutyl tin diacetate, dibutyl tin dilaurate, dibutyl tin maleate or dioctyl tin diacetate.

Other catalysts and information on the way in which they work may be found in Kunststoff Handbuch, Vol VII, by Vieweg and Höchtlen, Carl-Hanser-Verlag, Munich, 1966, in particular on pages 96 to 102.

The catalysts are generally used in a quantity of from 0.01 to 10%, by weight, based on the reactants.

The microcapsules may be produced continuously or in batches. Dispersion units generating a shear gradient are generally used. Examples of such dispersion units are flat blade paddle agitators, rotor-cage impellers, high-speed stirrers, colloid mills, homogenisers, ultrasonic dispersers, jets, steel jets, "Supraton" machines.

The intensity of turbulence during mixing is primarily responsible for the diameter of the microcapsules obtained. It is possible to produce capsules ranging from 1 to 500 μm in diameter, capsules having diameters of from 2 to 500 μm being preferred.

The diameter of the capsules is not critical to the effectiveness of the process according to the present invention and may be optimised according to the particular application envisaged.

The process according to the present invention may be used for encapsulating (any) solid or liquid substances, for example organic solvents, flameproofing agents, adhesives, catalysts, solutions of dyes and leuco dyes, blowing agents, oils, waxes, perfume oils, plant protection agents, fertilisers, acrylates, and plasticisers.

It must be regarded as extremely surprising that the two phases immiscible with one another are combined by the considerable excess of water during dispersion and the subsequent formation of the polymeric capsule walls without the occurrence of any irregularities.

The uniform wall structure and controllability of the degree of cross-linking during the wall-forming reaction by suitable choice of the reactivity and functionality of the reactants are not adversely affected in any way. Despite the very pronounced hydrophilic character of the wall-formers deblocked by water, no spontaneous or uncontrolled transitions into the aqueous phase are observed after they have been deblocked.

It must also be regarded as surprising that microcapsules of relatively large diameter and adequate stability may be produced by the process according to the present invention without any need for additional measures to be taken.

In conventional processes, it is necessary, for the production of relatively large capsules, to achieve the required stability by extremely prolonged after-treatment of the capsule dispersions or by using one of the wall-formers in several times the stoichiometric quantity in relation to the other. There is no need for these measures in the process according to the present invention.

The process according to the present invention affords numerous advantages not only in the production of microcapsules but also in the working-up and further application thereof.

The core materials required for encapsulation and the wall-forming reaction components are compatible with one another and hence may be stored together and added together as required during production of the dispersion. In terms of process technology, this is a very considerable simplification because it eliminates the need for the additional measures required in known encapsulation processes.

The reaction of the isocyanates with the deblocked reactants takes place sufficiently quickly so that it may readily be carried out continuously. This ensures that the particle size is satisfactorily adjusted and that a narrow particle size distribution is obtained. High volume/time yields are possible and are of considerable advantage for encapsulation processes.

Since the evolution of $CO_2$ during formation of the capsule wall is avoided by the process according to the present invention, there is no need to use anti-foam agents.

After production of the capsules, the particular continuous phase is substantially free from wall-forming or other components which considerably simplifies subsequent formulation of the capsule suspension for certain applications or, after isolation of the capsules, leads to extremely clean capsule powders without a need for preliminary exchange or preliminary purification of the continuous phase.

Another advantage of this procedure lies in the fact that it enables extremely thin capsule walls to be produced because there is no need for the generally necessary purification or exchange step in which the capsule walls are normally exposed to powerful mechanical forces and, hence, necessitated a basically undesirable thickness of the capsule wall.

Since the capsule wall is formed in one phase in the process according to the present invention, wall thickness may be adjusted very easily and the core material remains free from wall-forming reaction components. In addition, only stoichiometric quantities of wall-forming reaction components are required for the production of large-diameter capsules, resulting in considerable savings of material.

Through the additional use of wall-forming reaction components, the very considerable variability of the process according to the present invention provides for the production of capsules having a hitherto unknown wall structure. By suitably selecting the structure of the reactants, it is additionally possible to influence the character of the capsule wall membrane formed within certain limits so that, in addition to adequate cross-linking, it is also possible to provide the shell material with a certain degree of toughness.

Examples of the blocked reaction components produced by the condensation of polyamines or hydroxyamines with carbonyl compounds

| Blocked reaction component | Polyamine or hydroxyamine | Carbonyl compounds |
|---|---|---|
| A | hydrazine | acetone |
| B | hydrazine | isobutyraldehyde |
| C | hydrazine | methylisobutyl ketone |
| D | ethylene diamine | formaldehyde |
| E | 1,2-diaminopropane | formaldehyde |
| F | bis-(N,N'—aminoethyl)-1,2-ethylene diamine | isobutyraldehyde |
| G | 1,6-hexamethylene diamine | isobutyraldehyde |
| H | 1,6-hexamethylene diamine | isobutyraldehyde modified by Michael's addition with methyl acrylate |
| I | diethanolamine | isobutyraldehyde |
| K | diethanolamine | formaldehyde |

-continued

Examples of the blocked reaction components produced by the condensation of polyamines or hydroxyamines with carbonyl compounds

| Blocked reaction component | Polyamine or hydroxyamine | Carbonyl compounds |
|---|---|---|
| L | isophorone diamine | isobutyraldehyde modified by Michael's addition with ethyl acrylate |

EXAMPLE 1

93.5 g of diethoxy thiophosphoryloxyimino-phenyl acetonitrile (94.6% Volaton) are homogeneously mixed while stirring first with 4.92 g of a biuretised hexamethylene diisocyanate (NCO-content 22%) and then with 2.0 g of compound B. The resulting mixture is emulsified for 2 minutes in a previously prepared solution using a Kotthoff mixing siren (3860 r.p.m.). The previously prepared solution consists of 148.75 g of water containing 2% of polyvinyl alcohol (Mowiol 44-88) as protective colloid, 26.25 g of water containing 1% of montmorillonite (Bentone EW) as protective colloid and 26.35 g of ethylene glycol.

The dispersion is then stirred with a laboratory stirrer of the Lenard-Rapid type (200 r.p.m.) and heated to 50° C. for 2 hours. The resulting capsules range from 3 to 30 μm in diameter and have a core-to-wall ratio of approximately 95:5.

EXAMPLE 2

93.5 g of diethoxy thiophosphoryloxyimino-phenyl acetonitrile (94.6% Volaton) are homogeneously mixed while stirring first with 18.75 g of a biuretised hexamethylene diisocyanate (NCO-content 22%) and then with 6.59 g of compound G. The resulting mixture is emulsified for 2 minutes in a previously prepared solution using a Kotthoff mixing siren (3440 r.p.m.). The previously prepared solution consists of 125 g of water containing 0.5% of polyvinyl alcohol (Mowiol 40-88) as protective colloid, 50 g of water containing 1% of montmorillonite (Bentone EW) as protective colloid and 26.35 g of ethylene glycol.

During the two-minute dispersion period, a mixture of 3.42 g of hexamethylene diamine and 15 g of water is introduced into the dispersion after 1 minute. The dispersion is then heated to 50° C. while stirring with a laboratory stirrer. The resulting capsules range from 5 to 40 μm in diameter.

EXAMPLE 3

240 g of solvent naphtha (a mixture of aromatic hydrocarbons produced by BV-Aral) are homogeneously mixed while stirring first with 60 g of a hexamethylene diisocyanate containing isocyanurate groups (NCO-content 22.5%) and then with 34.7 g of compound G. The resulting mixture is emulsified in 1190 g of water containing 1% of gelatin as protective colloid by means of a laboratory stirrer of the Lenard-Rapid type (330 r.p.m.). The dispersion is then stirred for 2 hours at 60° C. Capsules ranging from 240 to 1100 μm in diameter are obtained.

EXAMPLE 4

12 g of solvent naphtha (a mixture of aromatic hydrocarbons produced by BV-Aral) are homogeneously mixed while stirring first with 3 g of hexamethylene diisocyanate containing oxadiazine trione groups (NCO-content 20.3%) and then with 0.5 g of compound I.

The resulting mixture is emulsified in 150 g of water containing 2% of polyvinyl alcohol (Mowiol 8-88) as protective colloid by means of a laboratory stirrer of the Lenard-Rapid type (500 r.p.m.). The dispersion is then stirred for 2 hours at 50° C. to complete formation of the capsule walls. The resulting capsules range from 180 to 850 μm in diameter.

EXAMPLE 5

12 g of ethylene glycol dimethacrylate are homogeneously mixed while stirring first with 1.33 g of a biuretised hexamethylene diisocyanate (NCO-content 22%) and then with 0.55 g of compound F. the resulting mixture is emulsified in 150 g of water containing 1% of hydroxymethyl cellulose (Tylose MH 50) as protective colloid by means of a laboratory stirrer of the Lenard-Rapid type (500 r.p.m.). The dispersion is then stirred for 2 hours at 50° C. to complete formation of the capsule walls. The capsules range from 150 to 800 μm in diameter.

EXAMPLE 6

12 g of solvent naphtha (a mixture of aromatic hydrocarbons produced by BV-Aral) are homogeneously mixed while stirring first with 3 g of a biuretised hexamethylene diisocyanate (NCO-content 22%) and then with 0.5 g of compound K. The resulting mixture is emulsified in 150 g of water containing 2% of polyvinyl alcohol (Mowiol 8-88) as protective colloid by means of a laboratory stirrer of the Lenard-Rapid type (500 r.p.m.). The dispersion is then stirred for 2 hours at 50° C. The capsules range from 120 to 750 μm in diameter.

EXAMPLE 7

93.5 g of diethoxy thiophosphoryloxyimino-phenyl acetonitrile (94.6% Volaton) are homogeneously mixed while stirring first with 18.75 g of a biuretised hexamethylene diisocyanate (NCO-content 22%) and then with 7.69 g of compound C. The mixture is then further processed in the same way as in Example 1. Microcapsules ranging from 3 to 30 μm in diameter are obtained, the core-to-wall ratio amounting to 78:22.

EXAMPLE 8

12 g of methylene chloride are homogeneously mixed while stirring first with 3 g of a biuretised hexamethylene diisocyanate (NCO-content 22%) and then with 0.79 g of compound D. The resulting mixture is emulsified in 150 g of water containing 0.5% of polyvinyl alcohol (Mowiol 40-88) as protective colloid by means of a laboratory stirrer of the Lenard-Rapid type (500 r.p.m.). The dispersion is then stirred for 2 hours at 50° C. to complete formation of the capsule walls. The capsules range from 200 to 950 μm in diameter.

EXAMPLE 9

The encapsulation of 12 g of methylene chloride is carried out as in Example 8, except that 0.92 g of compound E is used instead of compound D. The capsules have a diameter of from 200 to 950 μm.

EXAMPLE 10

The encapsulation of 12 g of solvent naphtha is carried out in the same way as in Example 6, except that 0.5 g of compound H is used instead of compound K. The capsules range from 160 to 850 μm in diameter.

EXAMPLE 11

128 g of tri-n-butylamine are intensively mixed first with 10 g of acetone, 10 g of toluene and 32 g of a hexamethylene diisocyanate containing isocyanurate groups (NCO-content 22.5%) and then with 9.38 g of compound A. The resulting mixture is then emulsified for 1 minute at 8330 r.p.m. (Kotthoff mixing siren) in a previously prepared solution of 333 g of water containing 1% of hydroxymethyl cellulose (Tylose MH 50) as protective colloid. The dispersion is then stirred for one hour at 70° C. by means of a laboratory stirrer of the Lenard-Rapid type (1000 r.p.m.). Capsules ranging from 3 to 30 μm in diameter are obtained.

EXAMPLE 12

93.5 g of diethoxy tiophosphoryloxyimino-phenyl acetonitrile (94.6% Volaton) are homogeneously mixed while stirring first with 18.75 g of 4,4'-diphenyl methane diisocyanate (Desmodur 44 V 20, NCO-content 31%) and then with 8.71 g of compound B. The mixture is then emulsified as in Example 1 in the solution described in that Example (Kotthoff mixing siren, 2 minutes at 3400 r.p.m.). The capsules range from 3 to 40 μm in diameter.

EXAMPLE 13

(a) 10 g of a biuretised hexamethylene diisocyanate (trifunctional, NCO-content 21.4%) are mixed with 3.57 g of component B. The mixture has a pot life of more than 2 hours. The mixture is emulsified in 300 g of an aqueous solution containing 0.5% of polyvinyl alcohol (Mowiol 26-88) as protective colloid (Kotthoff mixing siren: 10 minutes at 950 r.p.m.) and then stirred for 1.5 hours using a laboratory stirrer rotating at 500 r.p.m. Very hard solid beads ranging from 30 to 280 μm in diameter are obtained.

(b) 10 g of a biuretised hexamethylene diisocyanate (trifunctional, NCO-content 21.4%) are mixed with 5.71 g of component G. The mixture becomes viscous after 30 minutes, during which it may be emulsified in an aqueous solution as in Example 13(a) (Kotthoff mixing siren: 10 minutes at 9500 r.p.m.) and then stirred for 2 hours using a laboratory stirrer turning at 500 r.p.m.. Hard solid beads ranging from 3 to 10 μm in diameter are obtained.

(c) 10 g of a biuretised hexamethylene diisocyanate (trifunctional, NCO-content 21.4%) are mixed with 11.82 g of component L. 30 minutes after its preparation, the mixture is emulsified in an aqueous solution as in Example 13(a) (Kotthoff mixing siren: 3 minutes at 1800 r.p.m.) and then stirred for 1 hour using a laboratory stirrer rotating at 500 r.p.m. Hard solid beads ranging from 5 to 170 μm in diameter are formed.

(d) 10 g of a biuretised hexamethylene diisocyanate (trifunctional, NCO-content 21.4%) are mixed with 10.09 g of component H. The mixture has a pot life of more than 2 hours. 30 minutes after its production, the mixture is emulsified in an aqueous solution as in Example 13(a) (Kotthoff mixing siren: 10 minutes at 950 r.p.m.) and then stirred for 1 hour using a laboratory stirrer turning at 500 r.p.m. Hard solid beads ranging from 30 to 300 μm in diameter are obtained and may be dried on a filter at room temperature without agglomerating to form a free flowing capsule powder.

EXAMPLE 14

3 g of a triisocyanate of the type used in Example 13 and 1.71 g of component G are mixed. After 1 minute, 15 g of quartz crystals having a mean diameter of 200 μm are added and the three constituents mixed to form a homogeneous paste.

Using a Kotthoff mixing siren, the thus-formed paste is dispersed at room temperature in 300 ml of an aqueous solution containing 0.02% of polyvinyl alcohol (Mowiol 26-88) as protective colloid first for 30 seconds at 950 r.p.m. and then for 1 minute at 6050 r.p.m. The thus-formed dispersion is then stirred for 1 hour using a laboratory stirrer at 750 r.p.m. Thereafter, the quartz crystals are completely coated with resin either individually collectively. The particles range from 200 to 800 μm in diameter.

EXAMPLE 15

A uniform paste is prepared from 3 g of a triisocyanate of the type used in Example 13, 3.55 g of component L and 15 g of quartz crystals ranging from 100 to 300 μm in diameter, followed by dispersion and stirring in the same way as in Example 14. Agglomerates up to 5 mm in diameter are formed, all the crystals being coated with resin.

EXAMPLE 16

A uniform paste is prepared from 3 g of a triisocyanate of the type used in Example 13, 3.03 g of component H and 15 g of quartz crystals ranging from 100 to 300 μm in diameter, followed by dispersion in an aqueous Mowiol solution in the same way as in Example 14. The slurry is then stirred for 2 hours by means of a laboratory stirrer rotating at 500 r.p.m. and, at the same time, is heated to 60° C. over a period of 50 minutes. After cooling to room temperature, individual crystals completely coated with resin are obtained.

EXAMPLE 17

3 g of a triisocyanate of the type used in Example 13 and 0.86 g of component A are homogeneously mixed. 5 g of Lucidol Pulver 50 (benzoyl peroxide desensitised with plasticiser), a product of Akzo Chemie GmbH, 4240 Emmerich, Germany, are added to the resulting mixture which is then made into a homogeneous paste.

The thus-formed paste is dispersed in an aqueous Mowiol solution at room temperature using a Kotthoff mixing siren in the same way as described in Example 14. The slurry is then stirred using a laboratory stirrer (700 r.p.m.) for a total of 130 minutes and, at the same time, maintained at 60° C. for a period of 60 minutes. After cooling to room temperature, the product is filtered and dried. Agglomerates 200 μm in diameter and completely coated with resin are obtained.

EXAMPLE 18

The procedure is as in Example 17 up to dispersion of the paste in the aqueous Mowiol solution. The slurry is then stirred using a laboratory stirrer (700 r.p.m.) and a mixture of 10 ml of 37% HCl and 10 ml of water subsequently added. Agglomerates 500 μm in diameter and completely coated with hardened resin are formed over a period of 60 minutes at room temperature. They may be filtered off and dried in air without adhering to one another.

EXAMPLE 19

To test the effectiveness of the coated Lucidol-Pulver 50, the following mixtures are prepared and tested:

(a)
9.63 g of ethylene glycol dimethacrylate
0.04 g of saccharin
0.50 g of coated Lucidol-Pulver (Example 17)
0.03 g of dimethyl toluidine The pot life of this mixture up to solidification is 120 minutes. The shanks of iron bolts (M 14) are coated with the liquid mixture in such a way that the threads are just filled. Immediately afterwards a nut is screwed onto the shank. The Lucidol capsules are crushed, after which the mixture solidifies very quickly. After a hardening time of 48 hours, turning moments of from 20 to 27 Nm are required to loosen the nuts.

(b) The procedure is as in Example 19(a) using coated Lucidol-Pulver according to Example 18.

The pot life of the mixture up to solidification is 30 minutes. Turning moments of from 28 to 390 Nm (as measured after a hardening time of 48 hours) are required for loosening the nuts.

(c) For comparison with Examples 19(a) and 19(b), the following mixture is prepared with uncoated Lucidol-Pulver 50:

9.63 g of ethylene glycol dimethacrylate
0.04 g of saccharin
0.30 g of Lucidol-Pulver 50
0.03 g of dimethyl toluidine This mixture has a pot life of from 50 to 60 seconds so that only a few screws may be coated with each mixture and provided with nuts. After a hardening time of 48 hours, turning moments of from 28 to 37 Nm are required to loosen the nuts. A turning moment of less than 1 Nm is required for undoing loose nuts.

EXAMPLE 20

10 g of distilled water are emulsified at room temperature to a droplet size of from 100 to 150 μm (diameter) in 300 g of a chlorobenzene solution containing 1.5% of ethyl cellulose by means of a laboratory stirrer of the Lenard-Rapid type turning at 700 r.p.m. (1.5 minutes).

After 1.5 minutes, the rotational speed is reduced to 350 r.p.m. and a wall-forming solution of 63.93 g of chlorobenzene, 5.00 g of a triisocyanate of the type used in Example 13 and 1.07 g of component D is added and stirring continued for a total of 62 minutes at 350 r.p.m. After 5 minutes, the first visible capsule walls are formed, stabilising over a period of another 10 minutes. The microcapsules formed are smooth, fully transparent, mainly spherical with slight pimples and have diameters of from 40 to 160 μm.

EXAMPLE 21

An emulsion is prepared in the same way as in Example 20. After 1.5 minutes, the rotational speed is reduced to 350 r.p.m., a wall-forming solution of 60.18 g of chlorobenzene, 5.00 g of a triisocyanate of the type used in Example 13 and 4.82 g of component G is added and stirring continued for a total of 120 minutes. After 15 minutes, visible shells are formed, stabilising over a period of 100 minutes. Completely transparent, water-filled microcapsules having a smooth surface and ranging from 50 to 170 μm in diameter are formed.

EXAMPLE 22

An emulsion is prepared in the same way as in Example 20. After 1.5 minutes, the rotational speed is reduced to 350 r.p.m., a wall-forming solution of 56 g of chlorobenzene, 5 g of a triisocyanate of the type used in Example 13 and 9 g of component F is added and stirring continued for a total of 120 minutes. Visible shells are immediately formed, stabilising over a period of 30 minutes. The microcapsules formed are completely transparent with a smooth surface and a mainly spherical, partly dimpled form. The capsules range from 60 to 170 μm in diameter.

EXAMPLE 23

An emulsion is prepared in the same way as in Example 20. After 1.5 minutes, the rotational speed is reduced to 350 r.p.m., a wall-forming solution of 59.7 g of chlorobenzene, 5.0 g of hexamethylene diisocyanate (50.0% NCO) and 5.3 g of component F is added and stirring continued for a total of 120 minutes. visible shells are formed after 5 minutes, stabilising over a period of 30 minutes to form capsule walls having a slightly wrinkled surface. The spherical, completely transparent microcapsules range from 20 to 150 μm in diameter.

EXAMPLE 24

An emulsion is prepared in the same way as in Example 20. After 1.5 minutes, the rotational speed is reduced to 350 r.p.m., a wall-forming solution of 62.5 g of chlorobenzene, 5.0 g of hexamethylene diisocyanate (NCO content 50.0%) and 2.5 g of component D is added and stirring continued for a total of 120 minutes. Visible shells are formed after 5 minutes, stabilising over a period of 30 minutes. The microcapsules formed are completely transparent, have wrinkled surfaces and a mainly shrunken spherical form. They range from 60 to 160 μm in diameter.

EXAMPLE 25

An emulsion is prepared in the same way as in Example 20. After 1.5 minutes, the rotational speed is reduced to 350 r.p.m., a wall-forming solution of 61.15 g of chlorobenzene, 5.00 g of a diisocyanate containing one carbodiimide group (produced by the introduction of carbodiimide groups into 2,4-tolylene diisocyanate), molecular weight 307, NCO-content 27.6% and 3.85 g of component G is added and stirring continued for a total of 60 minutes.

The shells which are visible immediately after addition of the wall-forming solution stabilise in a few minutes. Completely transparent, mainly round microcapsules ranging from 30 to 150 μm in diameter are formed.

EXAMPLE 26

The procedure is as in Example 25, except that the wall-forming solution consists of 62.2 g of chlorobenzene 5.0 g of the same diisocyanate containing one carbodiimide group as in Example 25 and 2.8 g of component D.

Shell formation takes place immediately after addition of the wall-forming solution. The microcapsules formed are round, completely transparent, have a smooth surface and range from 10 to 140 μm in diameter.

EXAMPLE 27

The procedure is as in Example 26, except that 10 g of an HCl solution (containing 1% of HCl) are emulsified instead of water. The capsule wall stabilises more quickly than in Example 13. The microcapsules formed are clouded, potato-like in shape and have a wrinkled surface. The capsules have the same diameter range as in Example 26, although the capsule walls are distinctly harder.

EXAMPLE 28

The procedure is as in Example 27. 5 g of a polyisocyanate containing carbodiimide groups and having an NCO content of 5.6% are used as the isocyanate component of the wall-forming solution, its production being described below:

139.2 g of a mixture of 65% of 2,4-tolylene diisocyanate and 35% of 2,6-tolylene diisocyanate are throughly mixed with 2 g of phospholine oxide at room temperature and the resulting mixture poured into a 1-liter cardboard beaker. The mixture reacts, foams beyond the rim of the beaker as a result of the formation of $CO_2$ and hardens in a few hours with a foam volume of from 1.5 to 2.1. After 15 hours, the brittle foam is crushed using a mortar. The granulate has an average molecular weight of about 1500 and contains approximately 20% of carbodiimide groups and from 4 to 7% of NCO-groups.

Completely transparent, round microcapsules having a smooth surface and ranging from 30 to 130 μm in diameter are formed immediately after addition of the wall-forming solution.

What is claimed is:

1. A process for encapsulating products in a polymer by interfacial polymerization, in which a stabilized dispersion of droplets of a first liquid which is to be encapsulated or a stabilized dispersion of solid particles which are to be encapsulated is formed in a continuous phase of a second liquid, and wherein one of the two capsule wall-forming reaction components is present in free form and contains at least two isocyanate groups while the other of the two capsule wall-forming reaction components is present in reversibly blocked form and contains at least two reversibly blocked functional groups which are deblocked by water and contain at least two NH groups or one NH-group and one OH-group, both reaction components are present in the first or second liquid without reacting with one another and the reaction component which is present in reversibly blocked form is deblocked by means of water present in the second or first liquid and then reacts with the reaction component present in free form to form a polymeric capsule wall, the droplets of the first liquid or the solid particles being encapsulated in small capsules consisting of polymeric material.

2. A process as claimed in claim 1, characterised in that an organic liquid is used as the first liquid and an aqueous liquid is used as the second liquid, the organic liquid being insoluble in the aqueous liquid.

3. A process as claimed in claim 1, characterised in that an aqueous liquid is used as the first liquid and an organic liquid is used as the second liquid, the aqueous liquid being insoluble in the organic liquid.

4. A process as claimed in claim 1, characterised in that the reaction components present in reversibly blocked form are blocked polyamines or hydroxyamines which are converted into the free polyamines or hydroxyamines by water.

5. A process as claimed in claim 1, characterised in that the aqueous liquid additionally contains capsule wall-forming reaction components which contain at least two NH-groups or one NH-group and one OH-group.

6. A process as claimed in claim 5, characterised in that the capsule wall-forming reaction components additionally used are polyamines and/or hydroxyamines.

* * * * *